United States Patent [19]

Mueller

[11] 3,968,066
[45] July 6, 1976

[54] OIL AND WATER REPELLENT TEXTILE COMPOSITION CONTAINING A FLUOROCHEMICAL POLYURETHANE RESIN AND A QUATERNARY AMMONIUM SALT

[75] Inventor: Karl Friedrich Mueller, New York, N.Y.

[73] Assignee: Ciba-Geigy Corporation, Ardsley, N.Y.

[22] Filed: Apr. 18, 1974

[21] Appl. No.: 462,169

[52] U.S. Cl. .................... 260/29.2 TN; 260/29.6 F; 260/77.5 AP
[51] Int. Cl.² ........................................ C08L 75/04
[58] Field of Search ............... 260/29.6 F, 29.2 TN, 260/DIG. 20, 29.6 MN, 77.5 AP; 117/139.5 A

[56] References Cited
UNITED STATES PATENTS

| | | |
|---|---|---|
| 2,579,375 | 12/1951 | Eisen ........................ 260/DIG. 20 |
| 2,936,249 | 5/1960 | Hennemann et al ......... 117/139.5 A |
| 3,061,473 | 10/1962 | Tesoro ........................... 260/29.6 F |
| 3,150,120 | 9/1964 | Perrins ......................... 260/DIG. 20 |
| 3,175,004 | 3/1965 | Shapiro et al ................ 260/DIG. 20 |
| 3,210,312 | 10/1965 | Rosenberg et al. ........... 260/DIG. 20 |
| 3,398,182 | 8/1968 | Guenthner et al. ............. 260/482 B |
| 3,503,915 | 3/1970 | Peterson ...................... 260/29.2 TN |
| 3,547,894 | 12/1970 | Smeltz ......................... 117/139.5 A |
| 3,824,126 | 7/1974 | Katsushima et al. ........... 260/29.6 F |

*Primary Examiner*—Eugene C. Rzucidlo
*Attorney, Agent, or Firm*—Joseph G. Kolodny; Edward McC. Roberts; Prabodh I. Almaula

[57] ABSTRACT

The dry soil repellent properties of a fluorochemical textile resin useful to impart oil and water repellency to textiles can be improved by the presence of a quaternary ammonium salt containing a long hydrocarbon chain. The oil and water repellent properties are not adversely affected.

6 Claims, No Drawings

OIL AND WATER REPELLENT TEXTILE COMPOSITION CONTAINING A FLUOROCHEMICAL POLYURETHANE RESIN AND A QUATERNARY AMMONIUM SALT

BACKGROUND OF THE INVENTION

Fluorochemical textile resins have been used with great effect to impart or improve oil and water repellent characteristics of textiles. The common characteristic of these well-known fluorochemical textile resins is the presence of pendant perfluoroalkyl groups, which decrease the free surface energy of the fiber surface and accordingly, decrease the ability of liquids, polar or non-polar, to wet the fiber surface.

The mechanism of dry soiling, that is, soiling by particulate matter, is not influenced by free surface energy, but rather is a function of the surface characteristics of the finish, such as hardness, roughness and, notably, the antistatic properties thereof. For this reason, antistatic agents have been employed to reduce dry soiling in textile fabrics such as those which are intended for upholstery or carpeting. These antistatic agents are typically used at add-on levels of 3 to 10% by weight of fabric. One mechanism underlying the operation of the antistatic agents requires the presence of ambient moisture, which essentially acts as a conductor, thereby dissipating any static charge which would attract and hold particulate matter. The hydrophilic nature of these antistatic agents and the high add-on levels required increase wettability of the fabric by polar liquids, especially water. Thus, the properties of soil resistance and water repellency are antithetical. Those textile finishes which are highly water repellent, i.e. have AATCC spray ratings of 80–100, display very poor dry soil resistance while those textile finishes that display good dry soil resistance display poor water repellency (0–60 AATCC spray ratings).

It would be extremely useful to have a single finish which displays at the same time, the characteristics of high water and oil repellency together with high dry soil resistance.

DESCRIPTION OF THE INVENTION

It has now been found that the oil and water repellent properties of fluorochemical textile resins is maintained and the dry soil repellent property greatly increased by the presence of a quaternary ammonium salt containing a long hydrocarbon chain.

In one aspect, the invention relates to a composition comprising a polymeric or polymerizable fluorine-containing composition capable of imparting oil or water repellency to a textile and from about 3 to about 100%, based on the weight of said fluorine-containing composition, of a quaternary ammonium salt containing at least one long hydrocarbon chain. In another aspect, the invention relates to an improvement in a method for rendering a textile oil and water repellent wherein a solution, emulsion or dispersion of a fluorochemical is applied to a textile and the treated textile thereafter dried, the improvement comprising incorporating in the solution, emulsion or dispersion of fluorochemical from about 3 to about 100%, based on the weight of fluorochemical, of a quaternary ammonium salt containing at least one long hydrocarbon chain. In yet another aspect, the invention relates to a textile characterized by oil and water repellency together with improved dry soil repellence, said textile carrying from 0.01 to 10%, based on the weight of textile, of a fluorochemical and from 0.01 to 0.3%, based on the weight of textile of a quaternary ammonium salt containing at least one long hydrocarbon chain.

The quaternary ammonium compound can be one where the quaternizable nitrogen atom is substituted by aliphatic and/or aromatic groups or where the quaternizable nitrogen atom is a member of a heterocycle such as pyridine, quinoline, isoquinoline, imidazole, benzimidazole, morpholine, piperidine, pyrrolidine, pyridazine, pyrimidine, pyrazine, indazole, pyrazole, indole, and pyrrole.

Some of the useful kinds of quaternary ammonium compounds are described below.

Representative of the quaternary ammonium compounds wherein the quaternizable nitrogen atom is substituted by aromatic and/or aliphatic groups are compounds of formula

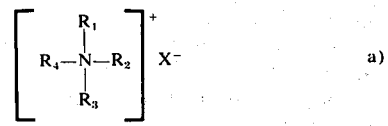
a)

where
R$_1$ is branched or straight chain alkyl of 8 to 21 carbon atoms; phenylalkylene of 12 to 27 carbon atoms; branched or straight chain alkenyl of 8 to 21; or straight or branched chain alkadienyl of 8 to 21 carbon atoms;

R$_2$ is branched or straight chain alkyl of 1 to 21 carbon atoms; phenylalkylene of 8 to 27 carbon atoms; $\gamma$-hydroxyalkyl of 2 to 4 carbon atoms; branched or straight chain alkenyl or alkadienyl of 8 to 21 carbon atoms; or the group of formula $$(CH_2CH_2O)_xH$$

where
x is an integer from 1 to 25;
or
R$_2$ is alkylene of 1 to about 8 carbon atoms containing a quaternized nitrogen atom whose substituents are alkyl, phenylalkylene, $\gamma$-hydroxyalkyl, alkenyl, alkadienyl or the group $$(CH_2CH_2O)_xH$$

all as previously defined;
R$_3$ and R$_4$ are selected from the same group as R$_2$ with the further limitation that only one of R$_2$, R$_3$ and R$_4$ can be selected from the same group as R$_1$ and
X$^-$ is an anion.

In a more preferred embodiment R$_1$ is as defined and R$_2$, R$_3$ and R$_4$ are alkyl of 1 to 4 carbon atoms, hydroxyalkyl of 2 to 4 carbon atoms or benzyl.

Particularly preferred are those compounds where R$_2$ and R$_3$ are methyl and R$_4$ is methyl or benzyl. Especially preferred are the compounds where R$_2$, R$_3$ and R$_4$ each is methyl.

Typical anions include chloride, bromide, iodide, fluoride, phosphate, acid phosphate, sulfate, bisulfate, methyl sulfate, ethylsulfate, sulfonate, carboxylate, acetate, chloroacetate, formate, oxalate, citrate, acrylate and perchlorate. Preferably X$^-$ is the anion of an acid having an ionization constant, pKa, of 5.0 or less, i.e., a dissociation such that the hydrogen ion concentration is at least $10^{-5}$.

$R_1$ as can be seen, is a higher alkyl, alkenyl, alkadienyl or phenylalkyl component. One convenient source for the components of $R_1$ is the group of saturated and unsaturated fatty acids containing from 8 to 25 carbon atoms in the aliphatic chain. Illustrative acids include capric, lauric, myristic, palmitic, stearic, arachidic, behenic, lignoceric and cerotic; decylenic, dodecylenic, palmitoleic, oleic, ricinoleic, petroselenic, vaccenic, linoleic, linolenic, eleostearic, licanic, parinaric, tariric, gadoleic, arachidonic, cetoleic and erucic.

Natural sources for these acids include tallow, cottonseed oil, coconut oil, peanut oil, palm oil, linseed oil, castor oil, safflower-seed oil, fish oil, and soya oil.

The alkyl group embraced by $R_2$ includes, in addition to the higher alkyl components described above, normal and branched lower alkyl components exemplified by methyl, ethyl, propyl, butyl, amyl, hexyl, heptyl and octyl.

Illustrative γ-hydroxyalkyl are hydroxyethyl, hydroxypropyl and hydroxybutyl.

Some representatives quaternary ammonium compounds are listed below. It should be noted that the listing is illustrative, that these kinds of compounds independently are old and well-known, as are their syntheses and that these compounds can be used singly or in admixture with other quaternary ammonium compounds.

octadecyl-trimethyl ammonium chloride
hexadecyl-trimethyl ammonium chloride
cetyltrimethylammonium bromide
tetradecyl-trimethyl ammonium chloride
dodecyl-trimethyl ammonium chloride
dodecyl-trimethyl ammonium bromide
decyl-trimethyl ammonium chloride
octyl-trimethyl ammonium chloride
octyl-trimethyl ammonium bromide
(10-phenyl)octadecyl-trimethyl ammonium chloride
octadecenyl-trimethyl ammonium chloride
octadecadienyl-trimethyl ammonium chloride
dioctadecyl-dimethyl ammonium chloride
di-hexadecyl-dimethyl ammonium chloride
di-(10-phenyl) octadecyl-dimethyl ammonium chloride
hexadecyl-trimethyl ammonium bromide
octadecyl-di(2-hydroxyethyl)-methyl ammonium chloride
octadecyl-dimethyl-benzyl ammonium chloride
hexadecyl-dimethyl-benzyl ammonium chloride
octadecyl-hexadecyl-dimethyl ammonium chloride
eicosyl-trimethyl ammonium bromide
dioctyldimethyl ammonium chloride
didecyldimethyl ammonium chloride
decyltriethyl ammonium chloride
hexadecylmethyl-di-(hydroxyethyl) ammonium chloride
hydrogenated tallow-trimethyl ammonium chloride
soya-trimethyl ammonium chloride
coco-trimethyl ammonium chloride
octadecyl-di(polyethyleneoxide-7)-methyl ammonium chloride
N-(9-phenyl-octadecyl)-N,N-dimethyl-N',N',N'-trimethyl propane diammonium dichloride
stearyl-benzyl-dimethyl ammonium chloride
octylsulfonamidopropyl-trimethyl ammonium chloride
stearylcarbonamidoethyl-trimethyl ammonium sulfate b. Among the useful aromatic heterocyclic quaternary ammonium compounds are those of formula

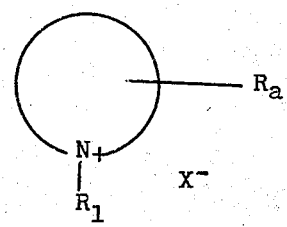

where
$X^-$ and $R_1$ are as described above and where

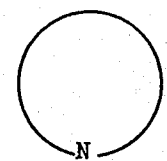

is pyridine, quinoline, isoquinoline, pyridazine or pyrimidine;

$a$ is an integer from 0–3 and

R is selected from hydrogen, alkyl of 1 to 4 carbon atoms, hydroxyalkyl of 1 to 4 carbon atoms, halogen (Cl, Br, I, F) alkoxy of 1 to 4 carbon atoms, carboxyl, carbalkoxy of 2 to 4 carbon atoms, acetyl, benzyl, sulfo, carbamyl and cyano.

when $a$ is greater than 1, the substituents can be the same or different.

Representative pyridine starting materials include pyridine; 2-methylpyridine; 3-methylpyridine; 4-methylpyridine; 2-ethylpyridine; 4-n-butylpyridine; 3,5-dimethylpyridine; 3,4-dimethylpyridine; 2-benzylpyridine; 3-benzylpyridine; 3-bromopyridine; 4-chloropyridine; 3,5-dibromopyridine; 3-ethyl-4-methylpyridine; 4-isopropylpyridine; 4-methoxypyridine; 2,4,6-trimethylpyridine; 3-pyridinecarboxylic acid; 3,5-pyridinedicarboxylic acid; 3-pyridinesulfonic acid; 3-pyridinecarboxyamide (nicotinamide); 2-amino-6-methylpyridine.

Useful quaternary compounds are exemplified by
hexadecyl-pyridinium chloride
hexadecyl-pyridinium bromide Representative quinoline and isoquinoline starting materials include quinoline; 3-chloroquinoline; 2-methylquinoline; 4-methylquinoline; 8-methylquinoline; 2,6-dimethylquinoline; isoquinoline; etc. to obtain such quaternized compounds as hexadecylquinolinium chloride and hexadecylisoquinolinium chloride c. Other useful heterocyclic quaternary ammonium compounds can have the formula

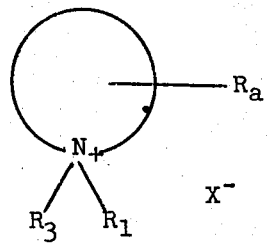

where
$a$, R, $R_1$, $R_3$ and $X^-$ are as previously defined and

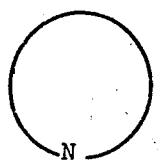

is imidazole, benzimidazole, morpholine, piperidine, pyrrolidine, pyrazine, indazole, pyrazole, indole, and pyrrole.

Representative compounds include
1-methyl-1-(2-hydroxyethyl)-2-heptadecyl imidazolinium chloride
1-methyl-1-(2-hydroxyethyl)-2-heptadecyl imidazolinium methylsulfate
N-hexadecyl-N-ethyl morpholinium ethosulfate.

The quaternary compounds can be prepared by alkylating the corresponding tertiary amine in known manner. The quaternary ammonium salt is typically employed in an amount of from 3 to about 100% based on the weight of fluorine-containing composition, described below. Most conveniently, the salt is added to a solution, suspension or emulsion of fluorine-containing composition. The preferred range is from about 10 to about 33% of the weight of fluorochemical. This amount provides a dry textile carrying from 0.01 to 10%, based on the weight of textile, of fluorochemical and from 0.01–0.3%, based on the weight of textile, of the quaternary ammonium salt. The preferred range is from 0.03 to about 0.1% of quaternary ammonium salt based on the weight of textile and from 0.05 to about 5% of fluorochemical, based on the weight of textile.

As indicated above, the quaternary ammonium salts enhance the properties of fluorochemical textile resins. The term "fluorochemical textile resins" is meant to include polymeric or polymerizable compounds, containing one or more pendant perfluoroalkyl groups, which compounds are useful to impart oil and/or water repellent characteristics to textiles. It has been found, quite surprisingly, that the ability of the quaternary ammonium salts described herein to improve dry soil resistance without degrading the oil and water repellence is independent of the structure of the fluorochemical and that the dry soil resistance of virtually all fluorochemical textile resins is improved by the presence of the quaternary ammonium salts described above.

Fluorochemical textile resins are well known and fall into two general categories.
1. Addition polymers
2. Condensation polymers The addition polymers are typically prepared by polymerization or copolymerization of perfluoroalkyl containing unsaturated monomers with a second suitable monomer, typically by free radical or ionic polymerization. Suitable monomers include esters of the $\alpha,\beta$-unsaturated acids, such as the acrylates, methacrylates, maleates, fumarates, itaconates and citraconates; vinylethers; vinylesters; allylesters; styrenes. The following table lists $R_f$-source, unsaturated moiety, relevant U.S. Patent and assigness:

| $R_f$-source | Unsaturated Moiety | Relevant U.S. Pat. No. | Assignee |
|---|---|---|---|
| $R_f SO_2 N-R-CH_2OH$, $R'$ ($R'=C_1-C_{11}$) ($R-C_1-C_{12}$) | acrylate methacrylate | 2803615 | 3M |
| $R_f SO_2 N-R-CH_2OH$, $R'$ ($R'=C_1-C_6$) ($R-C_1-C_{12}$) | fumarate maleate itaconate | 3736300 | CIBA-GEIGY |
| $R_f CH_2 CH_2 OH$ | acrylate methacrylate | 3282905 3378609 | DuPont |
| $R_f CH_2 OH$ | acrylate methacrylate | 3256230 | DuPont |
| $R_f-\overset{O}{\underset{R^1 \ R^2}{C-N-A-NH}}$ | acryl-methacryl amides | 3428709 | CIBA-GEIGY |
| $\underset{CF_3}{\overset{CF_3}{\diagdown}}CH-OH$ | acrylate methacrylate | 3304198 | Allied Chemical |
| $\underset{CF_3}{\overset{CF_3}{\diagdown}}CF-OH$ | acrylate methacrylate | 3384628 | USDA |
| $\underset{CF_3}{\overset{CF_3}{\diagdown}}CFO(CF_2)_nCH_2CH_2OH$ | acrylate methacrylate | Australian Appl. 36868 | Allied Chemical |
| $R_f-\overset{O}{\underset{H}{C-N-}}\overset{R}{\ }$ | acrylate methacrylate hydroxamate | 3412142 | CIBA-GEIGY |
| $(F_3C)_2CF-\underset{(CF_3)_2CF}{\text{phenyl}}-SO_2NCH_2CH_2OH$, R | acrylate methacrylate | 3407183 | Allied Chemical |

-continued

| $R_f$-source | Unsaturated Moiety | Relevant U.S. Pat. No. | Assignee |
|---|---|---|---|
| $R_f$—O—(CH$_2$CH$_2$O)$_n$H<br>n = 1–11 | acrylate<br>methacrylate | 1130822<br>British | ICI |
| $R_f$O—⟨phenyl⟩—CH$_2$OH | acrylate<br>methacrylate | 1130822<br>British | ICI |
| (F$_3$C)$_2$CFO(CH$_2$)$_n$OH | acrylate | 3424285 | USDA |
| $R_f$—SO$_2$—N(H)(C$_2$H$_5$)— | acryl sulfamide | 3728151 | 3M |
| C$_4$F$_9$CO—N(CH$_2$)$_2$OH<br>C$_4$F$_9$CO— | acrylate | 3728151 | 3M |
| | acrylate | 3728151 | 3M |
| $R_f$SO$_2$NCH$_2$—⟨CH$_3$,H-cyclohexyl⟩—CH$_2$OH | methacrylate | | |
| $R_f$SO$_2$CH$_2$CH$_2$OH<br>$R_f$SOCH$_2$CH$_2$OH<br>$R_f$CON—(CH$_2$)$_2$OH<br>   C$_2$H$_5$ | | | |
| (CF$_3$)$_2$CF(CF$_2$)$_4$CH=CH—CH$_2$OH | acrylate<br>methacrylate | 1101049<br>British | Daikin Kogyo |
| (CF$_3$)$_2$CH(CF$_2$)$_4$CH=CH—CH$_2$OH | fumarate<br>maleate | 119794<br>allowed 8/29/73 | CIBA-GEIGY |
| $R_f$—CH=CH—(CH$_2$)$_x$OH | acrylate<br>methacrylate | 1473451<br>French<br>Ser.No. | 3M |
| $R_f$—CH=CH—(CH$_2$)$_x$OH | fumarate<br>maleate | 199794<br>allowed 8/29/73 | CIBA-GEIGY |
| $R_f$CH$_2$CH—OH<br>     CH$_3$ | acrylate<br>methacrylate | 3384627 | Allied Chemical |
| $R_f$(CH$_2$)$_m$—O—(CH$_2$)$_n$OH<br>$R_f$CH=CH(CH$_2$)$_m$O(CH$_2$)$_n$OH | fumarate<br>maleate<br>itaconate | 3794623 | CIBA-GEIGY |
| $R_f$O(CF$_2$)$_p$(CH$_2$)$_m$OH<br>$R_f$O(CF$_2$)$_p$(CH$_2$)$_m$SH<br>$R_f$O(CF$_2$)$_p$CH=CH(CH$_2$)$_m$OH<br>$R_f$O(CF$_2$)$_p$(CH$_2$)$_m$O(CH$_2$)$_n$OH<br>$R_f$O(CF$_2$)$_p$CH=CH(CH$_2$)$_m$O(CH$_2$)$_n$OH<br>$R_f$(CF$_2$)$_{1-11}$—S—(CH$_2$)$_{2-11}$OH | acrylate<br>methacrylate | 3686283 | FMC |
| $R_f$XNH(CH$_2$)$_m$N$^+$(R')(R'')—CH$_2$CH$_2$OH  A$^-$ | Acrylate<br>Methacrylate | 3207730 | 3M |
| $R_f$—C(=O)—N(—CH$_2$CH$_2$OH)—C(CH$_3$)$_2$CH$_3$ | Acrylate<br>Methacrylate | 3304278 | Pennwalt |
| $R_f$SO$_2$NR(R')CCH=CH$_2$ | Vinylether | 3078245 | 3M |
| $R_f$SO$_2$N(R')R—C(=O)—CH=CH$_2$ | Vinylester | 2841573 | 3M |
| $R_f$SO$_2$N(R')R—C(=O)—O—CH$_2$—CH=CH$_2$ | Allylester | 2841573 | 3M |
| $R_f$(CH$_2$)$_3$(COOCH=CH$_2$ | Vinylester | 2841573 | 3M |
| $R_f$COOCH$_2$—CH=CH$_2$ | Allylester | 2841573 | 3M |
| $R_f$SO$_2$N(CH$_3$)—CH$_2$—C(=O)—CH=CH$_2$ | Vinyl ketone | 2841573 | 3M |
| $R_f$SO$_2$—⟨phenyl⟩—CH=CH$_2$ | Styrene | 2841573 | 3M |

| $R_f$-source | Unsaturated Moiety | Relevant U.S. Pat. No. | Assignee |
|---|---|---|---|
| $R_fSO_2N(CH_3)-CH_2-\text{C}_6H_4-CH=CH_2$ | Styrene | 2841573 | 3M |
| $R_fCONHCH=CH$ | Vinylamide | 3728151 | 3M |
| $R_f-X-\overset{+}{N}(CH_2CH=CH_2)_2$  R  A⁻ | Diallylammonium | 3717679 | Calgon |

Condensation polymers can be prepared from perfluoroalkyl substituted alcohols, diols, epoxides aziridines, amines, and the like by reaction with dibasic acids, acid chloride, anhydrides and isocyanates by known polycondensation techniques. Below are listed some representative $R_f$-compounds, their structure and relevant U.S. Patent, which can be used in the polycondensation-type reaction to provide useful fluorochemical textile resins.

The foregoing is illustrative of the variety of fluorochemical textile resins that are known and useful in connection with the present invention; it is not limiting. The term $R_f$ as used above connotes branched or linear perfluoroalkyl of 4 to 18 carbon atoms, more usually 6 to 12 carbon atoms.

A particularly preferred class of fluorochemical textile resins is the polyurethane compositions containing

| $R_f$-Structure | Reactive Group | Relevant U.S. Patent | Assignee |
|---|---|---|---|
| $(CF_3)_2CF-CH_2-CH\overset{O}{\underset{}{\diagdown\diagup}}CH_2$ | epoxy | 3361685 | USDA |
| $R_fCH_2-O-CH_2CH\overset{O}{\underset{}{\diagdown\diagup}}CH_2$ | epoxy | 3079214 | USDA |
| $R_f-\overset{O}{\underset{}{C}}-N\overset{CH_2}{\underset{CH_2}{\diagdown\diagup}}$ | aziridyl | 3300274 | USDA |
| $\triangleright N-\overset{O}{\underset{}{C}}-R_f-\overset{O}{\underset{}{C}}-N\triangleleft$ | aziridyl | 3300274 | USDA |
| $R_f(CH_2)_n\overset{O}{\underset{}{C}}-N\triangleleft$ | aziridyl | 3300274 | USDA |
| $R_f-z-\text{(triazine with NH}_2, NH_2\text{)}$ where Z is $-SO_2NH(CH_2)_nNH-$, $-CONH-$, $-SO_2N(R)-$, $-CO-NH(CH_2)_mNH-$, $-(CH_2)_n-NH-$ | triazinylamino | 3128273 | 3M |

In addition to the above, the following patents disclose polycondensation-type reactants that provide useful fluorochemical textile resins:

U.S. Pat. No. 3,305,390
3,362,782
3,296,264
3,427,332
3,382,097
3,377,197
3,420,697
3,322,490
2,917,409
3,398,182
British Pat. No. 1,267,224
3,096,207
3,188,340
3,431,140
3,406,004
3,342,630 the residue of an $R_f$-glycol characterized by the presence of perfluoroalkylthio groups on adjacent carbon atoms. This residue of the $R_f$-glycol has the structure

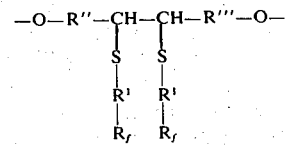

and the polyurethanes are characterized by the presence of at least one residue of formula

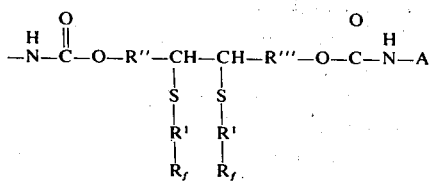

where
R$_f$ is perfluoroalkyl of 1 to 18 carbon atoms or said perfluoroalkyl substituted by perfluoroalkoxy of 2 to 6 carbon atoms;
R$^1$ is straight or branched chain alkylene of 1 to 12 carbon atoms, or alkylenethioalkylene, alkyleneoxyalkylene or alkyleneiminoalkylene of 2 to 12 carbon atoms;
R'' and R''' each independently is straight or branched chain alkylene of 1 to 12 carbon atoms or $$C_mH_{2m}(OC_kH_{2k})_r$$

where
m is 1 to 12
k is 2 to 6
r is 1 to 40, and
A is the divalent residue of an organic diisocyanate.

The R$_f$ glycol can be obtained by addition of 2.0 to 2.5 moles of a mercaptan of formula

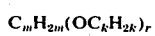

to one mole of an acetylenic diol of formula

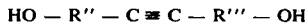

where
R$^1$, R'', R''' and R$_f$ are as described above, in the presence of an azo-type free radical catalyst such as azobisisobutyronitrile at a temperature of 60° to 80°C, in bulk or in the presence of a C$_6$–C$_{10}$ alkane solvent. The R$_f$-glycol has the formula

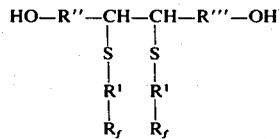

A preferred class of mercaptans is disclosed in U.S. Pat. No. 3,544,663 and can be obtained by reacting a perfluoroalkyl alkyliodide with thiourea, followed by hydrolysis.

This R$_f$-glycol can be incorporated in a urethane composition in an amount sufficient to provide from 0.5 to 65% fluorine by reaction with an appropriate diisocyanate and other polyols and polyol polymers conventional in the urethane art. The polyurethane can be rendered water-soluble or dispersible by reaction with a quaternizable dialkanolamine, e.g., an alkyl dialkanolamine such as methyldiethanolamine, which acts as a chain extender with isocyanate terminated prepolymers. Neutralization by addition of acid in the presence of a polar solvent results in a material that spontaneously forms an emulsion when water is added. This type of reaction is described by Suskind, "Polyurethane Latex", Journal of Applied polymer Science, Vol. 9, pp 2451–2458 (1965) and by Dieterich, Keberle and Witt, "Polyurethane Ionomers, A New Class of Block Polymers", Angew. Chem. Internat. Edit. Vol. 9, (1970) pp 40–50.

Of particular interest are the urethanes containing the residue of the R$_f$-glycol where
R$_f$ is perfluoroalkyl of 6 to 12 carbon atoms
R$^1$ is alkylene of 1 to 4 carbon atoms and
R'' and R''' are alkylene of 1 or 2 carbon atoms, obtained by adding an appropriate perfluoroalkyl mercaptan to 2-butyn-1,4-diol.

Generally, an isocyanate-terminated prepolymer containing a desired number of units derived from the R$_f$-glycol described above, having a molecular weight of 1,200 to 10,000, preferably 2,000 to 5000 is reacted with a difunctional tertiary amine (chain extender) to provide a segmented polymer containing tertiary nitrogen atoms which can be quaternized, as by alkylation with methyl chloride or dimethyl sulfate to yield a composition that, in polar media forms a dispersion when water is stirred in. The polyammonium polyurethane compositions are obtained even more readily by neutralization of the basic polyurethane composition in a polar organic solvent such as acetone, methyl ethyl ketone, tetrahydrofuran with a strong (HCl) or preferably, weak (pK$_a$>4) acid such as the C$_2$–C$_9$ alkanoic acids. Acetic acid is preferred because the acetic acid evaporates with the water on drying to leave the water-insoluble hydrophobic starting polyurethane composition.

In one embodiment a polyester or polyether polyol, R$_f$-glycol and excess diisocyanate, preferably an aliphatic diisocyanate, which are known to yield non-yellowing polyurethanes, are reacted and the resulting prepolymer reacted with an alkyl diethanolamine to yield a polyurethane composition containing tertiary amino groups. The basic urethane is dissolved in a polar solvent, such as acetone, and thereafter neutralized with acetic acid. An emulsion forms when water is stirred in.

The polyammonium polyurethane compositions can contain from as little as 5 to 800 milliequivalents of ammonium groups per 100 grams of polyurethane composition, preferably from about 50 to about 500 milliequivalents of ammonium groups per 100 grams.

The fluorochemical textile resins useful for imparting oil and water repellent properties to substrates to which they are applied may be prepared by any of well-known techniques. When prepared by bulk or suspension polymerization techniques, these compositions may be applied, for example, from a dilute solution in suitable solvents such as the fluoroalkanes, fluorochloroalkanes, fluoroalkyl substituted aromatics, alkyesters of perfluoroalkanoic acids, chlorinated alkene or aromatics, hydrocarbon aromatics, ketone esters and others. Concentrations of the fluorinated compound in the solvents to provide coatings with respective oil and water repellency properties will generally be sufficient to provide a deposit of fluorochemical on the order of 0.01 to 10%, preferably from 0.1 to 1.0%, by weight of substrate. As indicated, the quaternary ammonium compound is present in an amount of from 3 to 100% based on the weight of fluorochemical present.

If the fluorochemical is obtained as an aqueous latex or emulsion, the fluorochemical can be applied by diluting the latex concentrate obtained from the polymerization with water or other liquid diluting agent to obtain a diluted latex dispersion against sufficient to provide a deposit of fluorochemical of from 0.01 to 10% by weight of the substrate and preferably from 0.1 to 1.0% by weight of substrate. Here again the quaternary ammonium compound will be present in an amount ranging from 3 to 100% based on the weight of the fluorochemical.

The fluorochemical composition, comprising fluorochemical quaternary ammonium compound and solvents or water may be applied by any of the known techniques such as by dipping, spraying, brushing, padding, roll coating or by any desired combination of such techniques. The optimum method of application will depend principally on the type of substrate being coated.

For application to textile materials such as fabrics woven and non-woven, fibers, films, yarns, cut, staple, thread etc. or articles made from fabrics, fibers, films, yarns, etc. the fluorochemical textile resin compositions are preferably prepared as aqueous latices or emulsions which are then diluted, preferably with water and applied to the textiles from pad baths which may contain other treating materials. In accordance with this technique, the fabric or the textile materials is passed through the bath, passed through squeeze rolls adjusted to leave the desired amount of the latex on the fabric, dried at a temperature of about 25° to 125°C and then cured in a curing oven at a temperature in the range of from 120° to 195°C for 0.2 to 20 minutes. The weight of urethane composition deposited on the fabric may range from 0.01 to 10% of the weight of fabric. Preferably, very small amounts are used in the range of 0.1 to 1%, often from 0.1 to 0.5% to give high degrees of water and oil repellency. Any types of textile materials, such as cotton, wool, fiber glass, silk, regenerated cellulose, cellulose esters, cellulose ethers, polyesters, polyamides, polyolefins, polyacrylonitrile, polyacrylic esters, inorganic fibers, etc. either alone or blended in any combination may be successfully coated with the urethane compositions of the invention. The resulting textile material will be found to be repellent to water and oil, will retain its resistance to such agents even after many launderings and dry cleanings and will display improved dry soil resistance.

It will be often advantageous to use the urethane compositions in combination with conventional finishes, such as mildew preventatives, moth resisting agents, crease resistant resins, lubricants, softeners, sizes, flame retardants, antistatic agents, dye fixatives and water repellents.

Examples 1 to 10 illustrate the preparation of fluorine containing textile resins and emulsions.

Examples 11 to 36 illustrate the compositions and improvements of the invention.

EXAMPLE 1

This example illustrates the conversion of a perfluoroalkylalkylene iodide to the corresponding thiol by reaction with thiourea.

In a 1 liter flask is placed 100 g (0.138 mole) of $C_{11}F_{23}CH_2CH_2I$, 12.6 (0.166 mole) of thiourea and 100 ml of anhydrous ethanol and the mixture is refluxed for 5 hours. Then about 50 ml of the ethanol is stripped off under vacuum and 400 ml $H_2O$ and 11.04 g (0.138 mole) of 50% aqueous NaOH are added and the reaction mixture is boiled.

The mercaptan, $C_{11}F_{23}CH_2CH_2SH$, is collected in a Dean-Stark trap as a lower layer in good yield.

EXAMPLE 2

This example illustrates two alternate synthetic methods for preparing the thiol $R_f — R_1 — SH$ A. Reaction of $R_f — CH = CH_2$ with $H_2S$.

The olefin $C_9F_{19}CH = CH_2$ is reacted with $H_2S$ at +5°C at 200 PSIG $H_2S$, the mole ratio of $H_2S$ to olefin being about 30:1 in a water jacketed quartz tube irradiated with the ultraviolet light furnished by two 36″ germicidal lamps under static conditions. The major product is:

$C_9F_{17}CH_2CH_2SH$ 

B. Reaction of $R_fCH_2CH_2I$ with thiourea followed by hydrolysis.

In a 5 liter round bottom flask equipped with a water cooled condenser, stirrer and heating mantle is placed 624 g (1.0 mole) of $(CF_3)_2CF(CF_2)_6CH_2CH_2I$, 114 g thiourea (1.5 mole) and 3 liters of absolute ethanol. The reaction mixture is heated at reflux for 26 hours. Ethanol is then removed while adding water to maintain constant volume. 200 ml of 1M NaOH is then added and the solution co-distilled with water into a phase separator. The aqueous phase is returned to the reaction vessel. Further distillation gives the pure mercaptan $(CF_3)_2CF(CF_2)_6CH_2CH_2SH$.

EXAMPLE 3

2,3-Bis(1,1,2,2-Tetrahydroperfluorodecylthio)-butane-1,4-diol

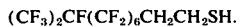

2-butyn-1,4-diol (1.1g; 0.013 mole) and 1,1,2,2-tetrahydroperfluorodecanethiol (13.64g; 0.028 mole) were stirred together in 16 ml 2-butanone with 0.4g azobisisobutyronitrile (ABN) catalyst. The solution was heated to 83°–85° for 4 hours, then a further 0.4g of catalyst was added and heating and stirring were continued for a total of 24 hours. After cooling, the solvent was removed by evaporation and the product was recrystallized from benzene to give 8.28g of the desired product (61% conversion). Further purification was effected by distillation of the material (b.p. 180°–204° at 0.6mm Hg) and final recrystallization from benzene. The pure product melted at 110°–112°. The infrared spectrum showed OH stretching frequency at 3370 cm$^{-1}$; CH stretching frequency at 2938 and 2878 cm$^{-1}$ and CF stretching frequency from 1330 to 1100 cm$^{-1}$.

The structure was confirmed by nmr examination, which showed signals at:

2.0 -3.4 ppm, —$CH_2CH_2S$— and OH (10H); 3.8 ppm, $OCH_2$ (4H); and 4.3 ppm, SCH(2H).

Analysis for $C_{24}H_{16}F_{34}O_2S_2$: Calculated: C, 27.55; H, 1.54; F, 61.73. Found: C, 27.54; H, 1.67; F, 61.46.

EXAMPLE 4

2,3-Bis(1,1,2,2-Tetrahydroperfluoroalkylthio)-butane-1,4-diol

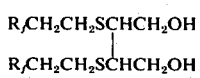

In a 500 ml Morton flask, 400g (0.8 mole) 1,1,2,2-tetrahydroperfluoroalkanethiol (similar to that described in Example 3, but having an average molecular weight of 500) was mixed with 327g (0.38 mole) 2-butyn-1,4-diol. With moderate stirring the flask was heating to 75° under nitrogen by means of an external oil bath. Azobisisobutyronitrile catalyst (ABN) was added in 5 equal portions of 1.32g each, at 25 minute intervals (total catalyst = 6.6g; 0.04 mole or 5 mole % based on thiol). After the second catalyst addition, an exothermic reaction was noted, which took the reaction temperature to 78° for a period of approximately 1 hours. The course of the reaction was followed by periodically removing samples and analyzing them by gasliquid chromatography (GLC). This showed that after 6½ hours no further reaction was occurring. The composition of the crude reaction product was (area %) thiol ($R_fCH_2CH_2SH$) 6.2; mono addition product

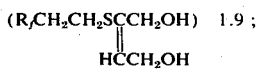

diaddition product

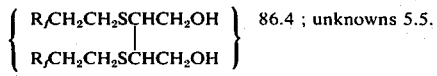

The crude product was purified by passage through a falling film molecular distillation apparatus at 110° and 8 mm Hg. giving 352g. (85.0% conversion) product consisting of 1.2% thiol, 1.5% monoaddition product, 93.0% diaddition product and 4.3% unknowns.

$R_f$ is a mixture of perfluoroalkyl chains $C_6F_{13}$, $C_8F_{17}$ and $C_{10}F_{21}$.

EXAMPLE 5

A hydroxy-terminated $R_f$-containing prepolymer was prepared as follows:

2,3-Bis(1,1,2,2-tetrahydroperfluorodecylthio)butane-1,4-diol (the diol of Example 3) (20 g; 0.0191 mole) was mixed with lysine diisocyanate methyl ester (2.7 g; 0.0127 mole) in 20 g methylethyl ketone. Dibutyltindilaurate was added (23 mg; 3.82 × 10⁻⁵ mole) to the resulting solution and the reaction vessel was heated to 75° with agitation until all isocyanate had reacted, as shown by the disappearance of the N=C=O band in the infrared. The solution was divided into two equal parts. One was used for Example 6. The other was poured into cold heptane to precipitate the urethane product. After drying, this portion weighed 21.0g. Infrared showed peaks at 3480 cm⁻¹ (O—H str.); 3340 cm⁻¹ (N—H str.) and 1715 cm⁻¹ (C=O str.; ester and urethane).

Elemental Analysis: Calcd'd for $C_{90}H_{72}F_{102}N_4O_{14}S_6$: C, 30.33; H, 2.04; N, 1.57; F 54.38. Found: C, 30.61; H, 2.00; N, 1.67; F 53.96.

EXAMPLE 6

The hydroxy-terminated $R_f$-containing prepolymer was converted into a urethane composition by reaction with additional diisocyanate and the reaction product capped by reaction with a monoalcohol.

The prepolymer of Example 5 was treated at 75° with further amounts of lysine diisocyanate (1.35g; 0.0064 mole) to cap the free OH groups and the urethane was terminated by the addition of 2,3-bis(1,1,2,2-tetrahydroperfluorodecylthio) propan-1-ol (6.5g; 0.0064 mole). Reaction was judged to be complete when no isocyanate peaks were visible in the infrared. The product was precipitated by pouring the MEK solution slowly into chilled heptane. After drying the final urethane weighed 28.9 g, and had a rubbery consistency. No OH stretching frequencies were visible in the infrared, but N—H stretching frequency was present at 3335 cm⁻¹ and C=O (ester and urethane) was a broad band centered at 1715 cm⁻¹.

Elemental Analysis for $C_{154}H_{124}F_{170}N_8O_{24}S_{10}$: Calculated: C, 30.72; H, 2.08; H, 1.86; F, 53.64. Found: C, 30.75; H, 2.10; H, 1.94; F, 52.95.

EXAMPLE 7

A hydroxy-terminated $R_f$-containing prepolymer was prepared as follows:

Methyl ethyl ketone (600g) was charged to a 2 l. flask fitted with a stirrer, thermometer, nitrogen inlet and a condenser protected with a drying tube. 2,3-Bis-(1,1,2,2-tetrahydroperfluoroalkylthio)butane-1,4-diol (600g; 0.571 mole)* was added together with a 1:1 mixture of 2,2,4-trimethylhexamethylene diisocyanate and 2,4,4-trimethylhexamethylenediisocyanate (80.16g; 0.381 mole). All reagents were rinsed in with an additional 50g MEK. The solution was heated to boiling and 50g solvent was removed by distillation to effect azeotropic drying of all materials. They dibutyltindilaurate (0.692g; 1.14 × 10⁻³ mole; 2 mole % based on diol) was added as a catalyst and the solution was heated under reflux for 6 hours, when the reaction was judged to be complete by the absence of the N=C=O infrared band at 2270 cm⁻¹. The solution was cooled to room temperature (25°) and diluted with MEK to a total of 2042g (33⅓% solids). A portion of the above material was taken to dryness. A quantitative recovery of a resinous material was obtained. Elemental analysis showed 52.8%F (theory: 53.4%F). Infrared bands at 3460 cm⁻¹ (O—H str.), 3340 cm⁻¹ (N—H str.) and 1705 cm⁻¹ (C=O str.) confirmed the structure of the hydroxy-terminated urethane prepolymer.

* The diol has the formula $R_fCH_2CH_2SCHCH_2OH$
$R_fCH_2CH_2SCHCH_2OH$ where $R_f$ is a mixture of prefluoroalkyl chains consisting of $C_6F_{13}$, $C_8F_{17}$ and $C_{10}F_{21}$. The diol is described in Example 4.

EXAMPLE 8

The hydroxy-terminated prepolymer of Example 7 (53.7g solution, 17.9g solids) was treated further at 75° with dimer acid derived diisocyanate (6.0g; 0.01 mole) (DDI, General Mills Co.) for 2 hours, then the urethane chain was completed by the addition of trimethylhexamethylene diisocyanate (2,2,4 and 2,4,4 isomer mixture) (1.05g; 0.005 mole) and N-methyldiethanolamine (0.19g; 0.01 mole). Reaction was complete in three hours, as shown by the disappearance of the N=C, O band (2270 cm$^{-1}$) in the infrared spectrum. A sample taken to dryness gave a quantitative yield of an off-white powder containing 35.8% F (theory 36.6%.F). For application to textile fabrics the polyurethane was applied either from solvent (MEK solution) or as an aqueous emulsion. The latter was made by first quaternizing the tertiary nitrogen atoms with glacial acetic acid and then pouring the MEK solution into a sufficient volume of water to give a clear emulsion.

EXAMPLE 9

The prepolymer of Example 7 (53.7g solution; 17.9g solids) was treated as in Example 10 with dimer acid derived isocyanate (6.0g; 0.01 mole) (DDI, General Mills Company) for 2 hours at 75° followed by further reaction with N-methyldiethanolmine (3.57g; 0.03 mole) and dimer acid derived isocyanate (15.0g; 0.025 mole) (DDI). Reaction was judged to be complete in 3 hours. An aliquot of the polyurethane solution was taken to dryness to yield a quantitative amount of off-white powder, containing 23.0%F (theory 22.4%). Application to fabrics was made either as a solvent based material or as a self-emulsifiable quaternized polyurethane as described in Example 8.

EXAMPLE 10

When the prepolymer of Example 7 (53.7g solution; 17.9g solids) is treated with dimer acid derived isocyanate (DDI) (6.0g; 0.01 mole) for 2 hours at 75°; there is obtained an isocyanate terminated prepolymer. This is extended with 2,2-bis(hydroxy methyl)-propionic acid (1.34g; 0.01 mole) and trimethylhexamethylenediisocyanate (1.05g; 0.005 mole). This acidic function is neutralized by the addition of potassium hydroxide and the product is self-emulsifiable when poured into water.

In evaluating the effect of the quaternary ammonium compounds on the properties of fluorochemical textile treating compositions, the following aqueous padbath formulation was used, comprising a permanent press resin, catalyst and surfactant:

0.1%Mykon NRW-3 - a nonrewetting thermodegradable surfactant (Sun Chemical Corp. Chester, S.C.)
0.2% Acetic acid
18.0% Permafresh 113B — a modified glyoxal-based crosslinking permanent press resin (Sun Chemical)
3.6% Catalyst X-4— a zinc nitrate solution (Sun Chemical)
- % The amount of fluorochemical emulsion necessary to give 0.06% fluorine on the fabric at 50% pickup.

After padding, the fabric was dried at 100°C for 2 minutes and cured at 163°C for 5 minutes.

The AATCC water spray test rating was determined according to Standard Test Method 22-1971 of the American Association of Textile Chemists and Colorists. Ratings are given from 0 (minimum) to 100 (maximum).

The AATCC Oil Rating was determined according to Standard Test Method 118-1972 of the American Association of Textile Chemists and Colorists. Ratings are given from 0 (minimum) to 8 (maximum). A commonly accepted lower value is an oil repellency of 4.

Dry soil resistance was determined according to the following procedure:

Finished and unfinished test fabrics are rotated together with standard dry soil in an Accelerator: no abrasive lining is used in the Accelerator for this text. Excess soil is removed under controlled conditions: the difference in appearance of the two samples is then evaluated instrumentally on a Gardner Color Difference Meter, and reported as change in whiteness (RD value).

Two 4 × 4 inch fabric samples, one finished and one unfinished, are required for each test. White fabric is recommended, as this emphasizes the observed differences in soiling; but dyed fabrics may also be tested if the styles in question are of particular interest.

Preparation — Each fabric sample is treated to prevent unraveling by sealing its edges with a solution of 10% Elvacite 2041 in trichloroethylene. This is applied with an eyedropper and allowed to dry; then the samples are conditioned overnight at 75°±5°F and 65% RH.

Portions of dry soil, each 0.20g, are weighed into disposable aluminum dishes, and stored overnight to a dessicator over Drierite or similar drying compound. The first pair of samples are removed from the conditioning chamber. These samples are folded in half, face side out, and one is placed around each blade of the Accelerator propeller. The accelerator is closed and one portion (0.20-g.) soil is introduced into the Accelerator through the small top port hole. The Accelerator is then run for 30 seconds at 3000 rpm. Continuous manual adjustment is needed during this 30-second soiling period to quickly achieve and maintain 3000 rpm. The test specimens are next removed from the Accelerator and placed in the Soil-Removal Unit.

The Soil-Removal Unit consists of a No. 5 Standard Buchner Funnel (186 mm. ID, 2½ inch deep, such as those supplied by the Fisher Scientific Co.), firmly supported and fitted with an acrylic cover. The acrylic cover has 25 3/16 inch air vent holes and a ¼ inch hole at 45° to the plane of the cover, through which air is injected to blow the fabrics free of excess soil.

The acrylic cover is put in place and held down with one hand. The ¼ inch copper tubing air line is inserted in the 45° opening provided; the tubing must not protrude more than ⅛ inch into the chamber. Air is then injected through the copper tubing at 40±3 psi for 1 minute, causing rapid rotation of the fabrics and removal of excess soil. The samples are stapled side-by-side onto 9½× 9½ inches squares of white blotting paper. Two tests (four specimens) may be placed on each square. The specimens and squares are stored in 10 × 15 inch polyethylene bags, to await evaluation, and the soiling procedure is continued with the next pair of fabric samples.

The Gardner Colorimeter is switched on and allowed to stabilize for at least 20 min. The largest-size glass cover plate is installed on the sensor and the instrument is adjusted and calibrated to read on RD, A, B scales. The first piece of blotting paper, with samples attached, is removed from its polyethylene bag. It is positioned so that a treated specimen is on the sensor of the colorimeter, and backed with a white enamel plate; and a whiteness reading (RD scale) is made of the specimen, backed by the blotter, backed by the plate. The whiteness of the corresponding untreated specimen is then obtained in a similar manner. Test results are reported as change in whiteness after dry soiling (delta RD) caused by finishing the fabric. This value is obtained by subtracting the RD value for the untreated specimen from that of the corresponding treated specimen; it is positive when the finish improves dry soiling properties, and negative when the treated fabric becomes more soiled than the untreated.

| Standard Dry Soil Used: | | |
|---|---|---|
| % | Ingredient | Supplier |
| 38 | Peat Moss | Michigan Peat, Inc., Capac, Mich. |
| 17 | Cement | Portland Cement |
| 17 | Kaolin clay, Peerless | R. T. Vanderbilt Co., Park Ave. New York City |
| 17 | Silica | Floated Powder - about 240 Mesh Fisher Scientific Co., Fairlawn, N.J. |
| 1.75 | Molacco Furnace Black | Colombian Carbon Co., Madison Ave. New York City |
| 0.50 | Red Iron Oxide | Chas. Pfizer and Co., New York City |
| 8.75 | Mineral Oil (Nujol) | Standard Oil Co. of New Jersey, Elizabeth, New Jersey |

The peat moss is dried 12 hours at 105°C in a forced draft convection oven, weighed, and then blended with other ingredients in a ball mill (without ceramic balls) 2 hours. The blend is dried on a large pan 8 hours at 50°C in a forced draft convection oven, and ball milled with ceramic ball for 24 hours. The soil is passed through a 40-mesh sieve, mixed in a ball mill without balls for 4 hours and then stored in a closed jar.

EXAMPLE 11

A series of emulsions of perfluorinated polyurethanes was prepared from prepolymers of Example 7 according to the procedure of Example 8 by preparing polyurethanes having the indicated molar amounts of each of the four components:

| Component | Run: | A | B | C | D | E | F | G | H |
|---|---|---|---|---|---|---|---|---|---|
| $R_f$-diol | | 3 | 3 | 3 | 3 | 3 | 3 | 3 | 3 |
| trimethylhexamethylene-diisocyanate | | 2 | 2 | 2 | 2 | 2 | 3 | 4 | 5 |
| *dimer-acid diisocyanate | | 6 | 2 | 3 | 5 | 10 | 1 | 0 | 0 |
| N-methyl diethanolamine | | 5 | 1 | 1 | 4 | 9 | 1 | 1 | 2 |

*a diisocyanate derived from dimerized oleic acid and sold by General Mills Company.

*A diisocyanate derived from dimerized oleic acid and sold by General Mills Company.

The emulsions as completed had the following composition:

| | |
|---|---|
| $R_f$-polyurethane | 22.50% |
| stabilizer (1) | 0.61 |
| acetic acid | 2.89 |
| MEK | 24.00 |
| quaternary ammonium cpd (2) | 0.06 and 0 |
| water | to make 100% |

1. the stabilizer had the formula

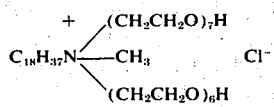

2. dicocodimethyl ammonium chloride sold as a 75% solution in isopropanol as Arquad 2C-75 by Armak Chemical Corp.

White cotton-polyester poplin fabric (35% cotton, 65% polyester) was treated with a padbath containing the urethane emulsion of Run A to provide 0.06%F on the fabric and 0.03% of the dicocodimethyl ammonium chloride and compared with the identical formulation devoid of the quaternary ammonium compound. The results are as follows:

| | | |
|---|---|---|
| % F on fabric | 0.06 | 0.06 |
| % Quat. ammonium salt on fabric | — | 0.03 |
| AATCC oil repellency | 5 | 5 |
| AATCC water repellency | 70+ | 70+ |
| Dry soil resistance | 6.2 | 14.3 |

Runs B through H were formulated as above and evaluated with (+) and without (−) the quaternary ammonium salt. The results are summarized below. As can be seen, the dry soil resistance in each case shows a substantial increase without substantially affecting the oil or water repellency.

| RUN | Quaternary Ammonium Compound | AATCC Oil Repellency | AATCC Water Repellency | Dry Soil Resistance |
|---|---|---|---|---|
| B | − | 6 | 70 | 6.9 |
|   | + | 5 | 70 | 13.5 |
| C | − | 6 | 80 | 8.3 |
|   | + | 6 | 80 | 14.9 |
| D | − | 6 | 70 | 7.9 |
|   | + | 6 | 80 | 16.9 |
| E | − | 6 | 80 | 6.7 |
|   | + | 6 | 80 | 14.2 |
| F | − | 6 | 70 | 7.3 |
|   | + | 5 | 70 | 15.9 |
| G | − | 5 | 70 | 7.1 |
|   | + | 4 | 50 | 14.3 |
| H | − | 5 | 50 | 6.9 |
|   | + | 5 | 50 | 13.5 |

EXAMPLE 12

A series of emulsions of perfluorinated polyurethanes was prepared from prepolymers of Example 7 according to the procedure of Example 8 by preparing polyurethanes having the indicated molar amounts of each of the four components:

| Component | Run: | A | B | C | D | E | F | G | H | I |
|---|---|---|---|---|---|---|---|---|---|---|
| $R_f$-diol | | 3 | 3 | 3 | 3 | 4 | 3 | 3 | 3 | 3 |

-continued

| Component | Run: | MOLES OF COMPONENTS |  |  |  |  |  |  |  |  |
|---|---|---|---|---|---|---|---|---|---|---|
|  |  | A | B | C | D | E | F | G | H | I |
| trimethylhexamethylene diisocyanate | | 3 | 3 | 3 | 3 | 4 | 4 | 4 | 4 | 5 |
| dimer-acid diisocyanate | | 2 | 3 | 4 | 5 | 1 | 2 | 3 | 4 | 10 |
| N-methyl diethanolamine | | 2 | 3 | 4 | 5 | 2 | 3 | 4 | 5 | 12 |

The emulsions as completed had the following composition:

| | |
|---|---|
| $R_f$-polyurethane | 25% |
| acetic acid | 3 |
| MEK | 23 |
| water | 49 |

The emulsion was added to the padbath formulation.
a. without a quaternary ammonium salt (−)
b. with 0.06% hexadecyl trimethylammonium bromide (+)

and evaluated on cotton-polyester poplin (35% cotton, 65% polyester). The results are summarized below, it being noted that no bath stabilizer was employed.

| RUN | Quaternary Ammonium Compound | AATCC Oil Repellency | AATCC Water Repellency | Dry Soil Resistance |
|---|---|---|---|---|
| A | − | 6 | 80 | 8.4 |
|   | + | 6 | 70 | 13.9 |
| B | − | 6 | 80 | 9.4 |
|   | + | 4 | 60 | 15. |
| C | − | 5 | 80 | 8.6 |
|   | + | 4 | 60 | 13.2 |
| D | − | 6 | 80 | 6.0 |
|   | + | 5 | 70 | 12.8 |
| E | − | 5 | 70 | 6.2 |
|   | + | 4 | 60 | 14.1 |
| F | − | 5 | 70 | 7. |
|   | + | 4 | 60 | 12.8 |
| G | − | 6 | 70 | 7.1 |
|   | + | 5 | 70 | 12.0 |
| H | − | 6 | 70 | 6.4 |
|   | + | 5 | 70 | 11.9 |
| I | − | 6 | 80 | 8.9 |
|   | + | 5 | 70 | 9.7 |

EXAMPLES 13–27

A polyurethane emulsion was prepared according to the procedure of Example 8 using the following molar amounts to prepare the $R_f$-polyurethane:

| Component | Moles |
|---|---|
| $R_f$-diol | 3 |
| trimethylhexamethylenediisocyanate | 9 |
| dimer-acid diisocyanate | 2 |
| N-methyl diethanolamine | 5 |
| bis-2-hydroxyethyldimerate* | 3 |

*The di(hydroxyethyl) ester of dimerized oleic acid sold by Emery Industries.

*The di(hydroxyethyl) ester of dimerized oleic acid sold by Emery Industries.

The emulsion as completed had the following composition:

| | |
|---|---|
| $R_f$-polyurethane | 25% |
| acetic acid | 3 |
| MEK | 23 |
| water | 49 |

This emulsion was added to the padbath formulation together with 0.06% of the indicated quaternary ammonium compound. No padbath stabilizer was used, except that examples 16 and 25 contained 0.02% of the stabilizer of example 11. Cotton-polyester (35/65) was treated and evaluated. The results are summarized below.

| Example Number | Name of Quaternary Ammonium Compound | AATCC Oil/Water Repellency | Dry Soil Resistance |
|---|---|---|---|
| 13 | hydrogenated tallow-trimethyl-ammonium chloride | 6/70 | 17.8 |
| 14 | (10-phenyl)-octadecyl-trimethyl-ammonium chloride | 5/70 | 15 |
| 15 | soya-trimethylammonium chloride | 5/70 | 16.6 |
| 16 | di(-9-phenyl)octadecyl-dimethyl-ammonium chloride | 6/80 | 14.0 |
| 17 | octadecyl-di(-2-hydroxyethyl)-methylammonium chloride | 6/70 | 15.4 |
| 18 | octadecyl-di(polyethylene oxide-7)-methylammonium chloride | 5/70 | 12 |
| 19 | 2-heptadecyl-1-(2-hydroxyethyl)-1-methyl imidazolinium methylsulfate | 5/70 | 15.8 |
| 20 | hexadecyl-pyridinium chloride | 6/70 | 16.0 |
| 21 | hexadecyl-trimethylammonium bromide | 5/70 | 15.9 |
| 22 | N-(9-phenyl-octadecyl)-N-N-dimethyl-N'N'N'-trimethyl propane 1,3-diammonium dichloride | 5/50 | 16.0 |
| 23 | octadecyl-trimethylammonium chloride | 4/70 | 16.5 |
| 24 | $C_8F_{17}SO_2NHCH_2CH_2CH_2N(CH_3)_3I$ | 5/70 | 14.0 |
| 25 | stearyl-benzyl-dimethylammonium chloride | 5/50 | 14.8 |
| 26 | N-hexadecyl-N-ethyl-morpholium ethosulfate | 5/70 | 14.5 |

EXAMPLE 30

The $R_f$-polyurethane emulsion of Examples 15–29 was used to prepare padbaths as follows:
A — padbath + $R_f$-polyurethane B — padbath + R_f-polyurethane + 0.06% di-coco-dimethylammonium chloride + 0.02% stabilizer (see Example 13)

C — padbath + R_f-urethane + 0.6% di-coco-dimethylammonium chloride + 0.02% stabilizer D — padbath + 0.06% di-coco-dimethylammonium chloride + 0.02% stabilizer The emulsions were padded (50% net pickup) on cotton-polyester (35/65) and evaluated.

The identical formulations were prepared using the indicated commercially available fluorochemical in place of the R_f-polyurethane.

| Example | Fluorochemical | |
|---|---|---|
| 31 | Scotchguard 210 | (3M) |
| 32 | Zepel B | (DuPont) |
| 33 | Scotchguard 234 | (3M) |
| 34 | Zepel 2829 | (DuPont) |
| 35 | Pentel 28 | (Pennwalt) |

The results are summarized below. In interpreting the data of this example it should be noted that the commercial fluorochemical finishes are not pure materials but, rather are formulated with extenders and other materials to optimize such properties as water repellency, hand, dry soil resistance etc. and usually contain substantial amounts of other emulsifiers. For this reason the dry-soil resistance increase obtained is not always as clear and pronounced as in Example 30.

The data also show that, in general, the lower add-on level (Run B) gives better results than the higher level (Run C).

| | | AATCC Repellency | | Dry Soil Resistance |
|---|---|---|---|---|
| | | Oil | Water | |
| Example 30 | | | | |
| | Padbath A | 5 | 70+ | 9 |
| | B | 4 | 70 | 13.4 |
| | C | 3 | 70 | 8.4 |
| | D | — | — | 3.7 |
| Example 31 | | | | |
| | Padbath A | 3 | 70+ | 6.1 |
| | B | 4 | 70 | 15.2 |
| | C | 1 | 0 | 10.2 |
| | D | — | — | 3.7 |
| Example 32 | | | | |
| | Padbath A | 4 | 100 | 6.0 |
| | B | 5 | 100 | 5.8 |
| | C | 0 | 0 | 7.3 |
| | D | — | — | 3.7 |
| Example 33 | | | | |
| | Padbath A | 5 | 50 | 14.7 |
| | B | 5 | 50 | 15.8 |
| | C | 1 | 0 | 13.4 |
| | D | — | — | 3.7 |
| Example 34 | | | | |
| | Padbath A | 4 | 70 | 11.8 |
| | B | 3 | 50 | 13.9 |
| | C | 1 | 0 | 13.8 |
| | D | — | — | 3.7 |
| Example 35 | | | | |
| | Padbath A | 4 | 100 | 13.7 |
| | B | 4 | 100 | 9.8 |
| | C | 4 | 100 | 1.5 |
| | D | — | — | 3.7 |

EXAMPLE 36

These examples illustrate the proposition that all surfactants do not perform similarly, that the various known surfactants are not equivalent and cannot be freely interchanged.

A series of emulsions of perfluorinated polyurethanes was prepared from the prepolymers of Example 7 according to the procedure of Example 8 by preparing polyurethanes having the indicated molar amounts of each of the indicated components:

| | MOLES | | |
|---|---|---|---|
| Component RUN: | A | B | C |
| R_f-diol | 3 | 3 | 3 |
| trimethylhexamethylene-diisocyanate | 3 | 3 | 2 |
| DDI | 3 | 3 | 5 |
| N-methyl diethanolamine | 3 | 1.8 | 4 |
| butane-1,4-diol | — | 1.2 | — |

The emulsions as completed had the following composition:

| | |
|---|---|
| R_f-polyurethane | 22.50% |
| Stabilizer[1] | 0.61 |
| Acetic acid | 2.89 |
| MEK | 24.00 |
| emulsifier | 0.06 |
| water to make | 100% |

[1] see Example 11.

| | | AATCC Repellency | | Dry Soil Resistance |
|---|---|---|---|---|
| RUN | Emulsifier | Oil | Water | |
| A | None | 5 | 70+ | 6.6 |
| | nonylphenoxypolyoxyethylene alcohol (9.5 moles ethylene oxide) | 5 | 50 | 6.7 |
| B | None | 5 | 80 | 4.7 |
| | nonylphenoxypolyoxyethylene alcohol (9.5 moles ethylene oxide) | 1 | 0 | 3.9 |
| | octadecyl-di(polyoxyethylene) amine (15 moles ethylene oxide) | 3 | 70+ | 4.6 |
| C | None | 6 | 70 | 7.9 |
| | alkyl-aryl-polyoxyethylene alcohol* | 4.5 | 70 | 7.3 |
| | hexadecyltrimethyl ammonium bromide | 5 | 70+ | 14.7 |

*Sold as Triton x-155 by Rohm & Haas Co.

It is clear that the various known emulsifiers do not provide equivalent results and that best results are obtained when a quaternary ammonium salt containing a long hydrocarbon chain is used.

What I claim is:

1. A composition comprising a fluorochemical polyurethane textile resin and from about 3 to about 100%, based on the weight of resin, of a quaternary ammonium salt containing at least one long hydrocarbon chain, wherein the fluorochemical polyurethane textile resin is of the formula

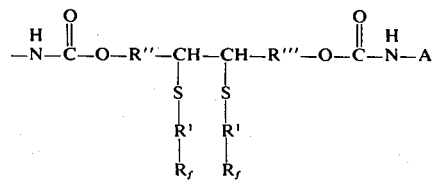

where
R_f is perfluoroalkyl of 1 to 18 carbon atoms or said perfluoroalkyl substituted by perfluoroalkoxy of 2 to 6 carbon atoms;

R¹ is straight or branched chain alkylene of 1 to 12 carbon atoms, or alkylenethioalkylene, alkyleneoxyalkylene of alkyleneiminoalkylene of 2 to 12 carbon atoms;

R″ and R‴ each independently is straight or branched chain alkylene of 1 to 12 carbon atoms or

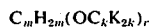

where
  m is 1 to 12,
  k is 2 to 6,
  r is 1 to 40, and
A is the divalent residue of an organic diisocyanate.

2. A composition according to claim 1 in which the quaternary ammonium salt has the formula

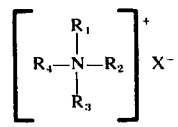   a)

where
  R₁ is branched or straight chain alkyl of 8 to 21 carbon atoms; phenylalkylene of 12 to 27 carbon atoms; branched or straight chain alkenyl of 8 to 21; or straight or branched chain alkadienyl of 8 to 21 carbon atoms;
  R₂ is branched or straight chain alkyl of 1 to 21 carbon atoms; phenylalkylene of 8 to 27 carbon atoms; γ-hydroxyalkyl of 2 to 4 carbon atoms; branched or straight chain alkenyl or alkadienyl of 8 to 21 carbon atoms; or the group of formula

where
  x is an integer from 1 to 25;
or
  R₂ is alkylene of 1 to about 8 carbon atoms containing a quaternized nitrogen atom whose substituents are alkyl, phenylalkylene, γ-hydroxyalkyl, alkenyl, alkadienyl or the group

all as previously defined;
  R₃ and R₄ are selected from the same group as R₂ with the further limitation that only one of R₂, R₃ and R₄ can be selected from the same group as R₁; and
  X⁻ is an anion

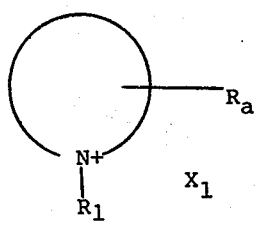

where
  R₁ and X⁻ are as defined above
  a is an integer from 0 to 3
  R is selected from hydrogen, alkyl of 1 to 4 carbon atoms, hydroxyalkyl of 1 to 4 carbon atoms, halogen (Cl, Br, I, F) alkoxy of 1 to 4 carbon atoms, carboxyl, carbalkoxy of 2 to 4 carbon atoms, acetyl, benzyl, sulfo, carbamyl and cyano and

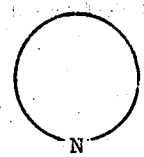

is pyridine, quinoline, isoquinoline, pyridazine or pyrimidine or

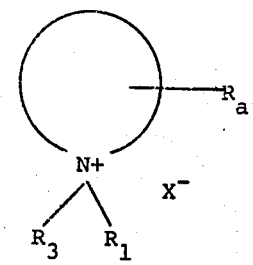

where
  a, X⁻, R, R₁ and R₃ are as previously defined and

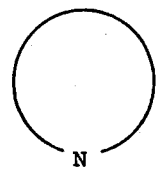

is imidazole, benzimidazole, morpholine, piperidine, pyrrolidine, pyrazine, indazole, pyrazole, indole and pyrrole.

3. A composition according to claim 2 in which the quaternary ammonium salt has the formula

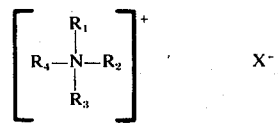   X⁻ where
  R₁ is branched or straight chain alkyl of 8 to 21 carbon atoms; phenylalkylene of 12 to 27 carbon atoms; branched or straight chain alkenyl of 8 to 21; or straight or branched chain alkadienyl of 8 to 21 carbon atoms;
  R₂, R₃ and R₄ are each independently alkyl of 1 to 4 carbon atoms, hydroxyalkyl of 2 to 4 carbon atoms or benzyl.

4. A composition according to claim 2 in which the quaternary ammonium salt has the formula

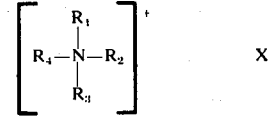   X where
R₁ is as defined
R₂ and R₃ are methyl and
R₄ is methyl or benzyl.

5. A composition according to claim 4 in which R₄ is methyl.

6. A composition of claim 1 further comprising water.